No. 706,179. Patented Aug. 5, 1902.
K. HORDISH.
NUT CRACKER.
(Application filed May 16, 1902.)
(No Model.)
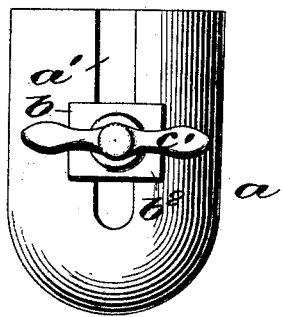
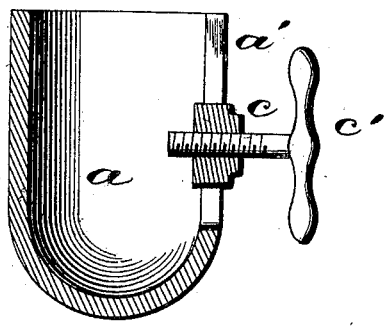
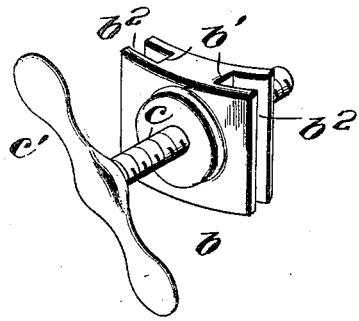
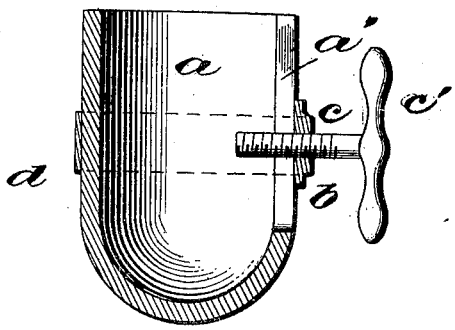
Witnesses
Inventor
Katie Hordish
By J. R. Nottingham
Attorney

UNITED STATES PATENT OFFICE.

KATIE HORDISH, OF DANVILLE, VIRGINIA.

NUT-CRACKER.

SPECIFICATION forming part of Letters Patent No. 706,179, dated August 5, 1902.

Application filed May 16, 1902. Serial No. 107,665. (No model.)

*To all whom it may concern:*

Be it known that I, KATIE HORDISH, a citizen of the United States, residing at Danville, in the county of Pittsylvania and State of Virginia, have invented certain new and useful Improvements in Nut-Crackers; and I do hereby declare the following to be a full, clear, and exact description of the invention, such as will enable others skilled in the art to which it appertains to make and use the same.

My invention relates to nut-crackers; and its principal object is to produce a simple and cheaply-constructed implement that will be durable and will effectually crack nuts; and to this end the invention consists, essentially, of the general arrangement and combination of the several parts, as will be hereinafter described, and pointed out in the claims.

In the drawings, Figure 1 is a perspective view of my improved nut-cracker; Fig. 2, a central vertical section; Fig. 3, a perspective view of the breaking-screw detached; and Fig. 4, a vertical section of a modification.

Referring to the several views, the letter $a$ indicates a nut-holder of any desirable shape, preferably in the shape of the bowl of a pipe. The nut-holder is provided with a slot $a'$, in which is seated a vertically-adjustable slide $b$, provided with flanges $b'$ and $b^2$, the former abutting against the inner surface of the wall of the holder and the latter against the outer surface thereof, as shown in Fig. 2. It will be noted that these flanges clamp the wall of the nut-holder on both sides of the slot, and thereby afford a strong and sufficient leverage for the "screw-pressure" when the screw is operated to crack a nut.

The letter $c$ indicates a breaking-screw, which is provided with a suitable handle $c'$, by means of which the breaking-screw is forced in to crack the nut and withdrawn to permit another nut to be inserted.

The operation of cracking the nut will be readily understood without further description other than to state that the position of the breaking-screw is readily adjustable up and down to bring the same to the most desirable position to crack the nut, whether it be large or small.

In Fig. 3 I have shown a modified form of my improved nut-cracker, in which the interior flange is dispensed with and a band $d$, integral with the outer flange $b^2$, substituted therefor. The band encircles the outer circumference of the nut-holder and is easily adjustable, so as to bring the breaking-screw into any desired position.

Having thus fully described my invention, what I claim, and desire to secure by Letters Patent, is—

1. A nut-cracker consisting of a slotted nut-holder, in combination with a breaking-screw vertically adjustable in the slot of said holder.

2. In a nut-cracker, the combination with a nut-holder having a slot in its wall, a vertically-adjustable slide seated in said slot, a breaking-screw operable in said slide, and means for holding the slide against the pressure of the screw when operated to crack a nut.

3. In a nut-cracker, the combination with a nut-holder having a slot in its wall, a vertically-adjustable slide, seated in the slot, said slide being provided with flanges for engaging the inner and outer surfaces of the nut-holder, and a breaking-screw operable in said slide.

In testimony whereof I affix my signature in the presence of two witnesses.

KATIE X HORDISH.
her mark

Witnesses:
W. W. WADDILL,
HOWARD RHODES.